United States Patent [19]

Zirm

[11] Patent Number: 5,137,459
[45] Date of Patent: Aug. 11, 1992

[54] DEVICE FOR CONDUCTING EXPERIMENTAL EYE OPERATIONS

[76] Inventor: Mathias Zirm, Fallmerayerstrasse, A-6020, Innsbruck, Austria

[21] Appl. No.: 599,049

[22] Filed: Oct. 17, 1990

[51] Int. Cl.⁵ .............................................. G09B 23/30
[52] U.S. Cl. ..................................... 434/271; 434/270
[58] Field of Search ............... 434/270, 271, 262, 263, 434/264, 265, 267, 268, 272

[56] References Cited

U.S. PATENT DOCUMENTS

| | | | |
|---|---|---|---|
| 2,959,891 | 11/1960 | Barnett et al. | 434/267 X |
| 3,381,392 | 5/1968 | Markman | 434/262 |
| 3,710,454 | 1/1973 | Mellor | 434/268 |
| 3,905,130 | 5/1974 | Gordon et al. | 434/271 |
| 4,850,876 | 7/1989 | Lutaenko et al. | 434/256 |
| 4,865,552 | 9/1989 | Maloney et al. | 434/271 |

FOREIGN PATENT DOCUMENTS

| | | | |
|---|---|---|---|
| 3146023 | 5/1983 | Fed. Rep. of Germany | 434/271 |
| 0868821 | 9/1981 | U.S.S.R. | 434/270 |
| 1082424 | 3/1984 | U.S.S.R. | 434/271 |
| 1394229 | 5/1988 | U.S.S.R. | 434/271 |

OTHER PUBLICATIONS

Ophthalmological Instruments by VEB Carl Zeiss JENA in Teaching, Training and Education; Albert Jütte et al.; 1982.

Primary Examiner—Gene Mancene
Assistant Examiner—L. Thomas
Attorney, Agent, or Firm—Paul H. Gallagher

[57] ABSTRACT

A device for use in performing experimental eye operations. A single eye, in either cut or uncut condition, is applied to and secured to an eye mounting. Associated with the eye mounting are tubes for conducting cleansing fluid to and from the eye for facilitating the operation thereon. A device simulating the front half of a human head, and having facial features has on at least one side a depression forming an artificial eye socket in which the eye mounting, with the eye, is positioned.

10 Claims, 4 Drawing Sheets

DEVICE FOR CONDUCTING EXPERIMENTAL EYE OPERATIONS

BRIEF SUMMARY OF THE INVENTION

The invention concerns a device for use in conducting experimental eye operations, in which a single eye, in either cut or uncut condition, is secured on an eye holder. The holder is provided with tubes for supplying a liquid to, and removal from, the eye being operated on, the fluid being used for facilitating the operation.

Eye holders generally have been used heretofore, but the conditions surrounding their use were unnatural, particular difficulties residing in the handling of the surgical instruments, and in handling of the cleansing fluid.

A main object of the present invention is to provide a device producing surrouding conditions that closely simulate actual and natural conditions.

To overcome such disadvantages, the device of the present invention is in the form of the front half of an artificial human head, having a socket therein for receiving the eye holder.

In further overcoming the disadvantages referred to, the present device includes as a principal feature thereof, that the simulated head has an eye socket at the location where it appears in the natural head, and as a result, the operator achieves skill in operating on the eye so mounted, that without further adaptation, he can perform an operation on an eye in a natural living head.

Another feature of the invention is that in the device, in the region of the eye socket, other depressions or recesses are provided for accommodating the tubes of the eye holder, whereby other instrumentalities, such as clamps, valves, etc. can be provided for controlling the tubes and the fluids therein.

Another feature is that the device includes additional recesses or channels for conducting cleaning fluids from the eye.

A further feature is that the device has elements for mounting it, these elements being so spaced as to accommodate wall mounting the device at different heights.

Still another feature is the provision of a case for carrying the eye holder and the tubes that are mounted thereon, and the other components and instrumentalities normally required for experimental operations on the eye.

An additional feature is that the case referred to hereinabove is capable of storing the artificial head half, along with the other instrumentalities referred to.

A further feature is that the artifical head half can, upon its removal from the case, be mounted on the case itself in a position enabling operation on the eye.

Another feature is the provision of a simple means for mounting the eye, including a styrofoam plate having a hole in which the eye is placed, the styrofoam plate being mounted in the holder with the eye positioned for photographing elements within the eye.

Still another feature is the provision of a lighting system with lighting lamps, coverings, and mountings and lenses for use with the camera.

Still another feature is a novel arrangement wherein the device, with the eye, can be readily positioned so that a camera can view into the interior of the eye.

An additional feature is an arrangement similar to that immediately above, including a tilted mirror to accommodate lenses to be used in association with the camera.

DETAILED DESCRIPTION

Figure 1:
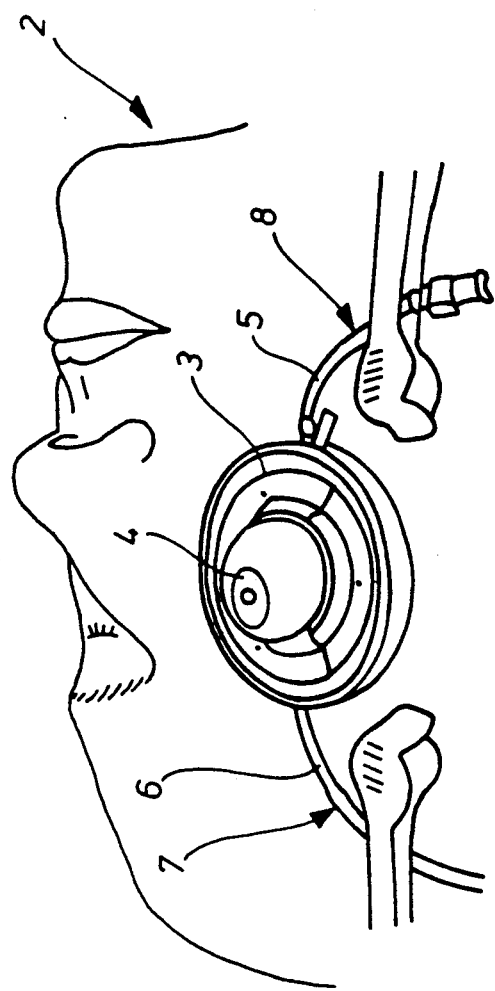
FIG. 1 is a perspective view of the head half having an eye socket, and including the eye mounting inserted in the socket.
Figure 2:
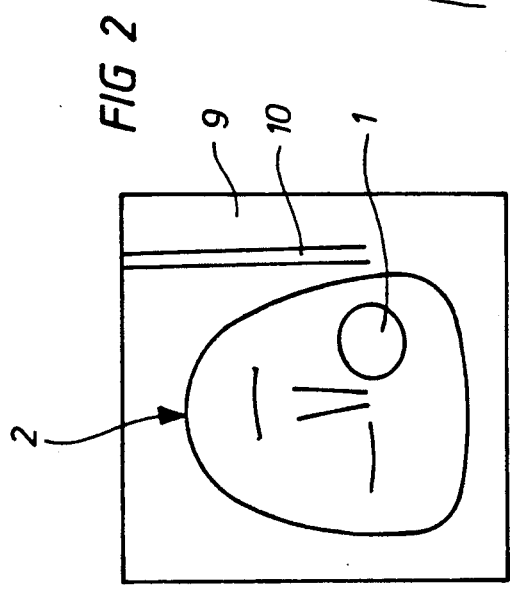
FIG. 2 shows the device, the head half.
Figure 4:
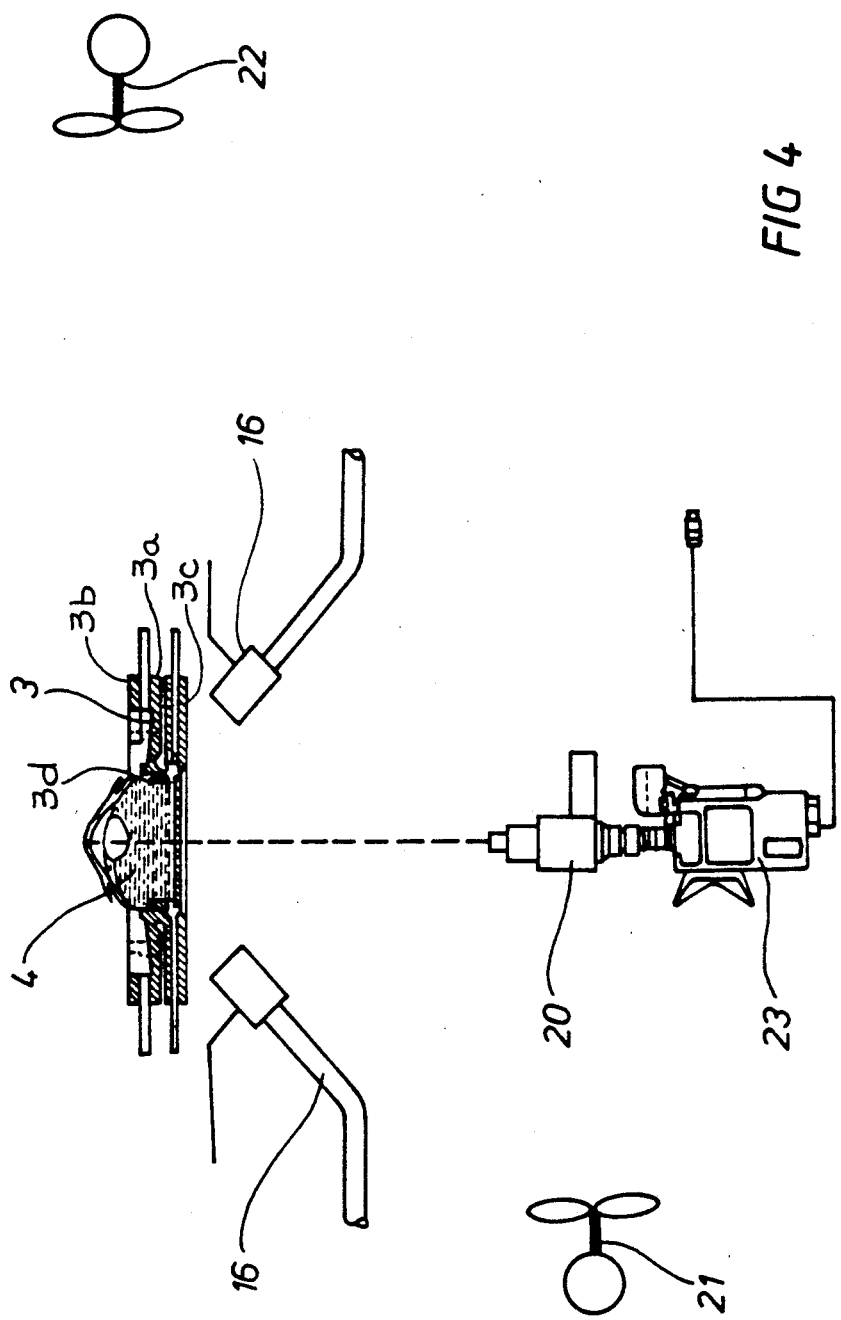
FIG. 4 is a schematic view of the eye mounting means, without the head half, and arranged in a lighting system in connection with a camera and cooling ventilators.

The device as a whole is shown in FIG. 1 and is in the form of a simulated front half of the human head. At one side is an eye mounting 3 which is inserted into a depression 1 forming an eye socket, in the device 2 as shown in FIG. 2. In the eye mounting 3 is an eye 4 mounted in such a manner as to make the eyeball accessible for operation thereon, a portion of the eyeball being utilized. Referring to FIG. 4, the mounting 3 includes a plate $3a$ having a front surface $3b$ and a rear surface $3c$ and having a hole $3d$ in which the eye is placed. The plate may be of styrofoam and it holds the eye by the engagement of the marginal edge of the hole with the eye. The eye so held is in proper position for the camera 23 to be directed into the eye, as referred to again hereinbelow.

Leading out from the eye mounting 3 are tubes 5, 6 preferably lying in channels or depressions 7, 8.

In the arrangement just referred to, the simulated face and eye, and the position of the eye, produce operating conditions very similar to those actually encountered in treating a natural head and eye, and consequently in the handling of the instruments used in the operation, the operator is working in circumstances very similar to those surrounding the natural eye and head.

FIG. 2 shows the device 2 on, or as an integral part of, a member 9, which may be in the form of a plate. The device, including the member 9 may be of any suitable material, such as plastic.

As shown in FIG. 2, the member 9 may be provided with a runoff channel 10 in which the cleaning fluid leaving the eye mounting can easily run off.

Figure 3:
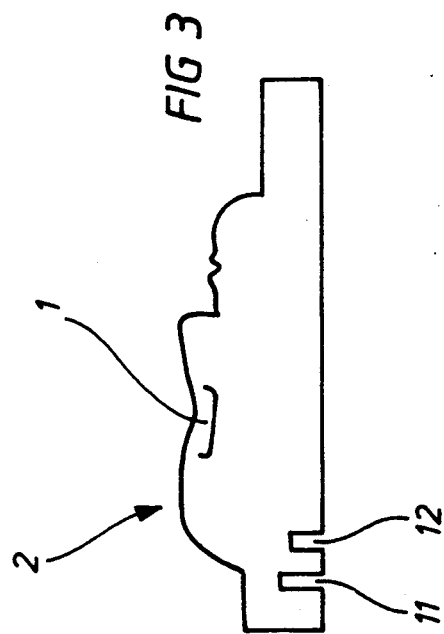
FIG. 3 is a side view of the head half.

Preferably the device or head 2 (FIG. 3) is provided on the underside with grooves 11,12 or comparable elements, spaced at different heights, relative to upright position of the head, preferably at the upper position thereof, at the level of the forehead. By means of these elements the device can be mounted at different heights, such for example as on a corner of the case in which it is carried, or in other position, and in a posture or attitude for the operator to work on it.

Figure 5:
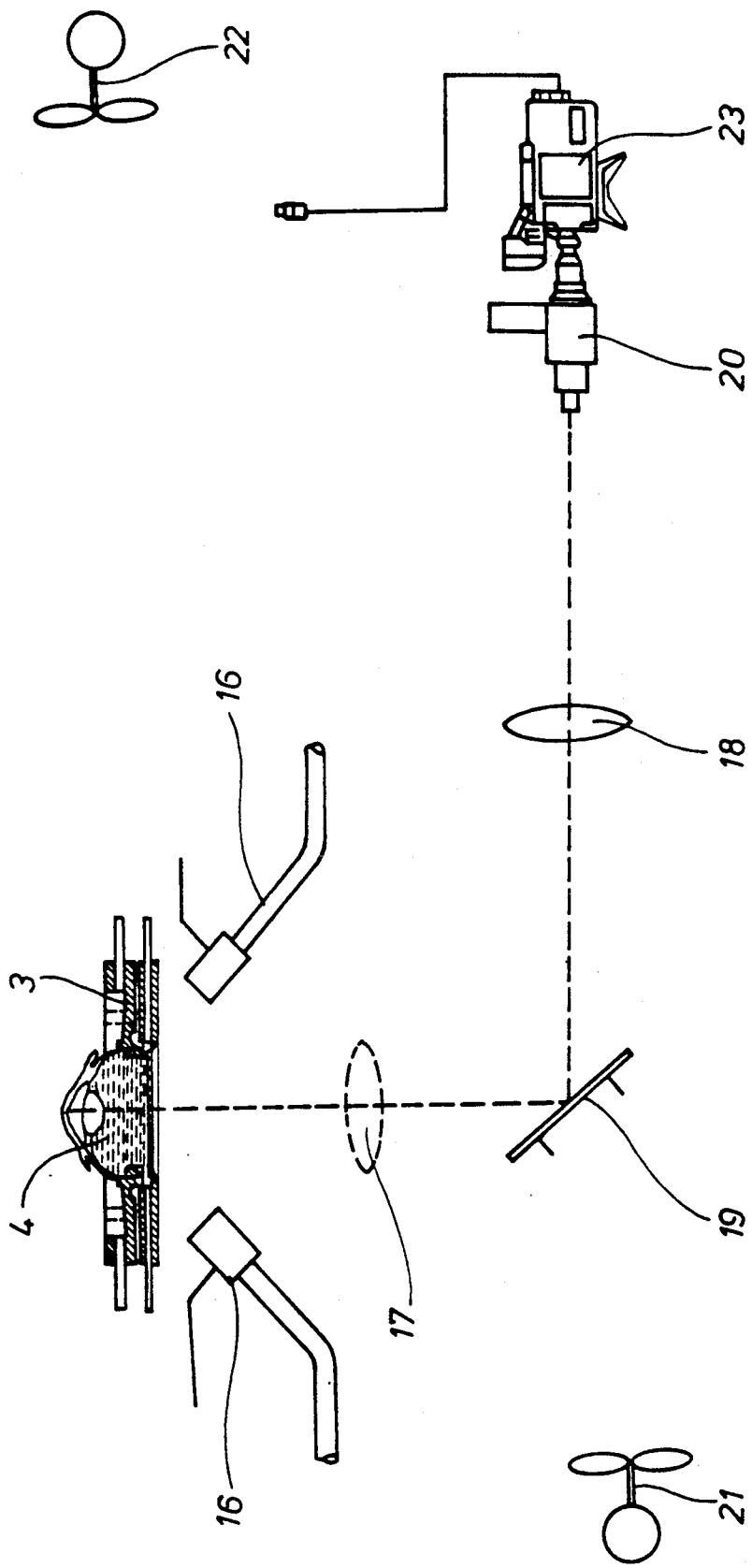
FIG. 5 is a view similar to FIG. 4 but including a tilted mirror interposed between the eye and the camera, and lenses utilized in the system.
Figure 6:
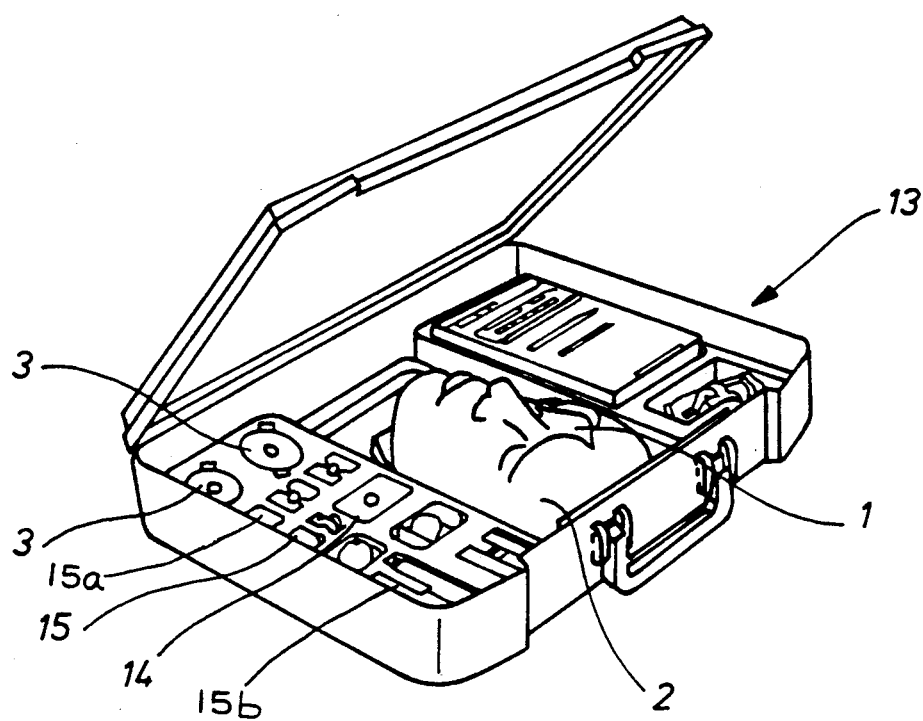
FIG. 6 is a perspective view of the head half, and associated instrumentalities, video cassettes, etc.

The entire group or assemblage including the head and all of the other elements are preferably mounted in and carried in a case or portable carrier 13 (FIG. 6). The entire assemblage includes the device 2 and other components utilized in the operation, such as knives, cutting device 14, pressure membranes 15, bottles of materials 15a, video cassettes 15b. Other components that may be provided, and carried in the case, include a video camera 23 (FIGS. 4, 5). The case includes partitions for segregating the various components and elements and the device or head 2 may be lifted from the case and hung or mounted on an edge or corner of the case, in position for operating thereon.

In such handling of the device or head, it may be put in an inclined or sloping position to render it more easy to operate thereon, the arrangement closely approaching actual operating conditions such as with a natural head.

A feature here pointed to, is that the half-head has simulated natural facial features, and positions the eye mounting 3, and the eye 4 for facilitating the eye cutting device 14 (FIG. 6), thus producing an experimental setting of conditions that also exist in actual circumstances surrounding a natural eye and head.

Figure 7:
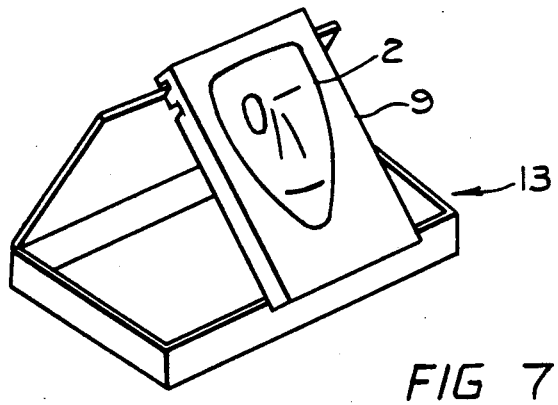
FIG. 7 is a perspective view showing the plate mounted on the case.

Emphasis is also pointed to the arrangement in which the entire group of elements, also referred to as an operation system, are carried in the case 13, which may be set up and used, as shown in FIG. 7, in an experimental manner in any suitable location. It is also practical to utilize the entire assemblage in connection with visual instruction.

FIG. 4 shows the eye mounting 3 with the eye 4 positioned therein, in this case the device, or half head, being omitted to better present the other elements. Within the device is a lighting system 16 for illuminating the interior of the eye and a camera 23 which includes a macro lens 20. Additionally for cooling the device, ventilators or fans 21, 22 are provided.

In FIG. 5 is shown an arrangement similar to that of FIG. 4, but this arrangement includes a tilted mirror 19 arranged at a suitable optical angle relative to the camera 23. In this case lenses 17, 18 are also provided in the optical line.

I claim:

1. A device for use in performing an experimental eye operation, comprising,
   a plate (9) having a front surface and a rear surface, and having a head portion in the form of the front half of a human head, with simulated facial features facing on the front surface,
   the head portion having on at least one side a depression forming an eye socket (1),
   an eye mounting having tubes (5,6) for conducting cleansing fluid to and from the eye for facilitating the operation,
   the eye mounting being mounted in the eye socket,
   the head portion and eye mounting, when the eye mounting is mounted in the eye socket, together forming a hole through the device from front to rear, and the eye mounting being capable of holding an eye in the hole with the rear side of the eye exposed through the device to the rear.

2. A device according to claim 1 wherein,
   the device in at least the head portion thereof, is provided with channels (7,8) in which said tubes (5,6) are disposed, the tubes leading from the eye socket.

3. A device according to claim 1 wherein,
   the plate (9) is provided with a channel (10) for conducting cleansing fluids from the eye socket.

4. A device according to claim 1 wherein,
   the plate is provided with grooves (11,12) for mounting the device, the grooves being spaced apart to enable the device to be mounted at different heights.

5. A device according to claim 1 and including,
   a case having partitions forming corresponding compartments,
   the device including additional components including bottles (15a), eye cutting device (14), videocassettes (15b),
   the device and the components thereof, including said additional components, being in respective ones of said compartments, and
   the case and the plate having complementary elements for mounting the plate on the case.

6. A device according to claim 1 wherein,
   the eye mounting (3) includes a styrofoam plate (3a) having a hole therethrough that is a part of said hole through the device, and
   the eye (4) is necessarily positioned also in the hole in the styrofoam plate, the styrofoam plate thereby holding the eye.

7. A device according to claim 1 and including,
   a lighting system (16) having incandescent lamps, and optical lenses.

8. A device according to claim 1, and including,
   ventilators (21,22) operable for cooling the plate including the head portion thereof.

9. A device according to claim 1 wherein,
   the plate (9) and the eye mounting (3) therein are positioned at an optical angle similar to an optical bank, and including,
   a camera (23) with macro lens (20) is directed to the eye mounting.

10. A device according to claim 9 wherein,
    the camera (23) is disposed at an optical angle to the mounted eye (4),
    the device includes a tilted mirror (19) in the optical angle of the camera,
    at least one lens (17,18) in operable association with the tilted mirror in the optical angle, and
    the lenses and the tilted mirror being incorporated in the device.

* * * * *